United States Patent
Hanson

(10) Patent No.: US 10,616,335 B2
(45) Date of Patent: Apr. 7, 2020

(54) CONTROLLER-BASED CONFIGURATION PROXY

(71) Applicant: CISCO TECHNOLOGY, INC., San Jose, CA (US)

(72) Inventor: Danny William Hanson, Cottage Grove, MN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 288 days.

(21) Appl. No.: 15/239,572

(22) Filed: Aug. 17, 2016

(65) Prior Publication Data

US 2018/0054353 A1 Feb. 22, 2018

(51) Int. Cl.
*G06F 15/177* (2006.01)
*H04L 29/08* (2006.01)
*H04L 12/24* (2006.01)

(52) U.S. Cl.
CPC ...... *H04L 67/1097* (2013.01); *H04L 41/0806* (2013.01); *H04L 67/2861* (2013.01)

(58) Field of Classification Search
None
See application file for complete search history.

(56) References Cited

U.S. PATENT DOCUMENTS

| | | | |
|---|---|---|---|
| 7,194,619 B2 | 3/2007 | Abbondanzio et al. | |
| 7,356,573 B2 | 4/2008 | Sharma et al. | |
| 7,574,491 B2 | 8/2009 | Stein et al. | |
| 8,856,257 B1* | 10/2014 | Zhang | G06F 11/3006 709/207 |
| 8,861,537 B1 | 10/2014 | Braithwaite et al. | |
| 9,235,710 B2 | 1/2016 | Jacobs | |
| 2004/0024905 A1* | 2/2004 | Liao | H04L 29/06 709/239 |
| 2008/0199012 A1* | 8/2008 | Niinomi | G06F 21/78 380/277 |
| 2009/0063495 A1* | 3/2009 | Gomez | H04L 67/1097 |

(Continued)

OTHER PUBLICATIONS

Novak, Robert, "Cisco UCS for beginner-an end-user's overview," posted as blog post on Feb. 11, 2014 from rsts11 on WordPress. conn; 6 pages.

(Continued)

*Primary Examiner* — Brian Whipple
*Assistant Examiner* — Gregory P Tolchinsky
(74) *Attorney, Agent, or Firm* — Polsinelli PC

(57) ABSTRACT

In one aspect of the present disclosure, a management controller configured for assisting configuration of a compute node is disclosed. The management controller includes a processor and a memory communicatively coupled to the processor and operable to instruct the processor to assist configuration of the compute node by receiving a request to configure the compute node, obtaining configuration information for the compute node, serving as a proxy emulating a presence of the compute node on a fabric, discontinuing to serve as the proxy after the compute node is configured. In some embodiments, serving as a proxy emulating a presence of the compute node on a fabric may include logging in to the fabric on behalf of the compute node and staying logged in to the fabric while the compute node is being configured with one or more configurable resources.

20 Claims, 6 Drawing Sheets

(56) References Cited

U.S. PATENT DOCUMENTS

| | | | | |
|---|---|---|---|---|
| 2009/0161692 A1* | 6/2009 | Hirata | ............ | H04L 49/351 |
| | | | | 370/466 |
| 2010/0017497 A1* | 1/2010 | Brown | ............ | H04L 12/4633 |
| | | | | 709/217 |
| 2014/0317247 A1* | 10/2014 | Sudhoff-Ewers | ............ | |
| | | | | G06F 9/45533 |
| | | | | 709/220 |
| 2015/0188774 A1* | 7/2015 | Nadaf | ............ | H04L 41/145 |
| | | | | 709/223 |
| 2015/0304233 A1 | 10/2015 | Krishnamurthy et al. | | |
| 2016/0196365 A1* | 7/2016 | Astigarraga | ............ | G06F 17/5009 |
| | | | | 703/21 |
| 2016/0241643 A1* | 8/2016 | Astigarraga | ............ | H04L 67/1097 |
| 2018/0032372 A1* | 2/2018 | Devendran | ............ | G06F 9/5011 |

OTHER PUBLICATIONS

"Understanding Cisco Unified Computing System Service," White Paper, Cisco Systems, Inc., Apr. 2010; 12pages.

\* cited by examiner

CONTROLLER-BASED CONFIGURATION PROXY

FIELD OF THE DISCLOSURE

This application relates to the field of data center computing, and more particularly to a system and method for efficient management of compute nodes within a data center infrastructure.

BACKGROUND

Data centers are increasingly used by enterprises for effective collaboration and interaction and for efficient management of data and resources. A typical data center network contains myriad network elements, including hosts, load balancers, routers, switches, etc. The network connecting the network elements provides secure user access to data center services and an infrastructure for deployment, interconnection, and aggregation of shared resources as required, including applications, hosts, appliances, and storage. Improving operational efficiency and optimizing utilization of resources in such data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

The present disclosure is best understood from the following detailed description when read with the accompanying FIGURES. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
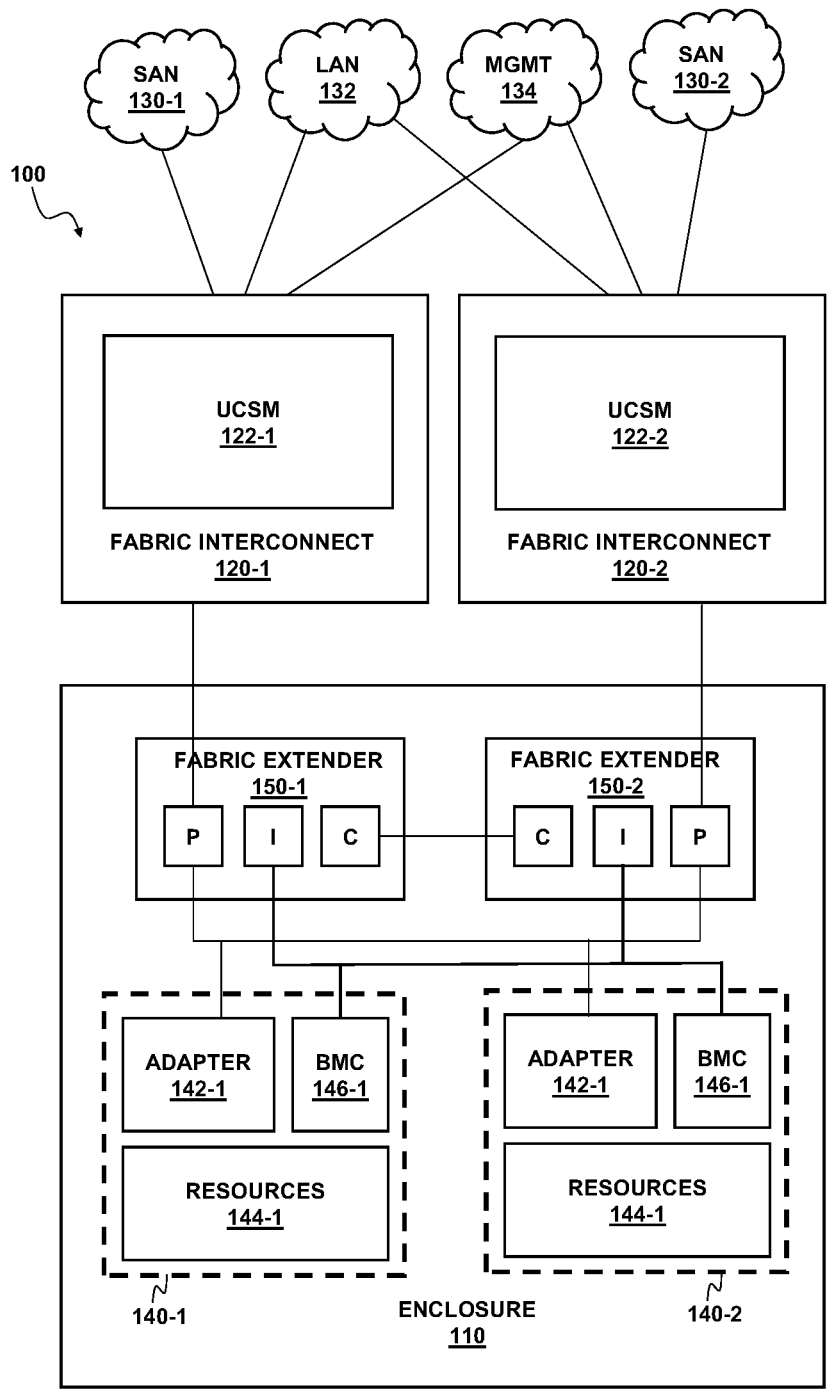
FIG. 1 is a block diagram of a network environment implementing a UCS.

In modern data center deployments, there are many advantages to having a centralized controller element that manages complete configuration of data and compute resources along with providing full operational control. An example of such a centralized controller element is provided by Cisco's® Unified Computing System (UCS), which is used in the following description as an example for explaining some embodiments in accordance with the present disclosure. In particular, the following description is provided with reference to efficient management and configuration of USC resources using USC Manager (UCSM). However, Cisco's® UCS is just one example and embodiments of the present disclosure are applicable, with modifications that would be apparent based on the descriptions provided herein, to managing and configuring a broader range of various data center resources. All of these embodiments, therefore, are within the scope of the present disclosure.

The UCS is an x86-based data center platform useful for providing, for example, large-scale data and hosting services. The central point of the UCS architecture may be considered to be a controller software element, referred to as the UCS Manager or UCSM, which may be implemented on the input/output (IO) aggregation nodes, such as e.g. fabric interconnect devices, or on other network elements (compute nodes). In certain embodiments, a UCS may include one or more blade servers, one or more rack servers, or a combination of blade and rack servers. Both the rack form factor and the blade form factor provide industry-standard connectors and interfaces, enabling a UCS to conform to open protocols and to use third-party hardware and software. In certain embodiments, a UCS may be provided with a plurality of servers, each of which may host a hypervisor such as VMware ESXi, Microsoft Hyper-V, Linux KVM, Citrix Zen server, or similar. In other embodiments, a server may be provided with a host operating system (OS) such as Microsoft Windows, RedHat Linux, Oracle Linux, or similar.

In certain circumstances, it is desirable for a server to have certain configurable resources rather than fixed and immutable attributes. Thus, one useful function of a UCS is to provide configurable attributes for servers, and thus provide increased flexibility to clients operating hypervisors and conventional servers on the UCS.

There is disclosed herein, by way of some simple non-limiting examples, an enterprise server computing platform (e.g., Cisco's® UCS), that may be configured to provide stateless computing, wherein each node has no set configuration, including for example, media access control (MAC) addresses, universally-unique identifiers (UUIDs), firmware, basic input/output system (BIOS) settings, or Input/Output devices themselves (such as e.g. an interface card). Because UCS is an open architecture, it may be compatible with off-the-shelf and legacy solutions which could be provided as configurable resources on UCS nodes.

Conventionally, a UCS node, such as e.g. a server, and resources provided thereon are configured with active participation from a UCSM centralized controller which invokes configuration on a server baseboard management controller (BMC) of the node, the 10 system components, etc. The UCSM policy element is configured by system administrators on the side of the customer that acquired the UCS system. In such implementations, the UCS node is actively involved in the process in that it needs to at least boot up and log in to a fabric, i.e. a network of devices and peripherals operating together, in order to allow application of toolsets to configure the node and its' resources, a process commonly referred to as "provisioning."

In contrast, according to one or more example embodiments of the present disclosure, techniques are disclosed for configuring resources on a UCS node, e.g. for configuring hard disks or other data storage devices on a UCS server, without the active involvement of the node, possibly at times when the node is not even physically present/available. These techniques are based on a recognition that a controller of a UCS, such as e.g. a UCS manager (UCSM), may serve as a proxy (i.e. emulate functionality) of a UCS node for which the resources are to be configured, during provisioning of the node. By proxying the actual operational modes for the UCS node it controls, such a controller could aid in carrying out the administrative tasks without forcing the end customers to actually build the node and before proceeding with node deployments.

In one aspect of the present disclosure, a management controller configured for assisting configuration of a compute node is disclosed. The management controller includes a processor and a memory communicatively coupled to the processor and operable to instruct the processor to assist configuration of the compute node by receiving a request to configure the compute node, obtaining configuration information for the compute node, serving as a proxy emulating a presence of the compute node on a fabric, discontinuing to serve as the proxy after the compute node is configured. In some embodiments, serving as a proxy emulating a presence of the compute node on a fabric may include logging in to the fabric on behalf of the compute node and staying logged in to the fabric while the compute node is being configured with one or more configurable resources.

As used herein, the term "compute node" refers to a hardware apparatus or a virtual machine, in which one or more applications (e.g., software programs), e.g. user applications, are executed, and which provides processing, memory, network and/or storage resources.

As will be appreciated by one of ordinary skill in the art, aspects of the present disclosure, in particular the functionality related to assisting configuration of a compute node described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing UCS manager and/or various control nodes) or be stored upon manufacturing of these devices and systems.

Example Embodiment of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment may have different advantages, and no particular advantage is necessarily required of any embodiment.

An important benefit of UCS as described in the present disclosure is so-called "stateless computing." Stateless computing means that each node within the UCS, such as a server, need not have a fixed or immutable configuration. Rather, many attributes of the node can be persistently configured, and the node can then be operated as though those persistent attributes were immutable attributes of a standalone system. For example, a standalone system may have a fixed and immutable media access control (MAC) address for a network interface card (NIC). The MAC address may be, for example, provided by a read-only memory (ROM) or other memory that is not user configurable. In contrast, a node on a UCS may have a user configurable MAC address. Thus, a UCS client can specify a desired MAC address, and the NIC on that UCS node may be configured with that MAC address.

Non-limiting examples of attributes that may be configured by a UCS include the following: for storage devices, worldwide port name (WWPN) or worldwide node name (WWNN) of the server computer, virtual storage area networks (VSANs) with which the server computer is associated, any adapter policy specifying error handling and timing settings, and configurations of the local storage drive of the server computer.

Configurable hardware attributes may include, by way of non-limiting example, a universally unique identifier (UUID) of the server computer, basic input/output system (BIOS) settings, firmware levels/versions of the server computer, and boot policies.

Network attributes that may be configurable include, by way of non-limiting example, the MAC address of the server computer, the NIC firmware (e.g., associated with the network interface) of the server computer, the quality of service (QoS) assigned to the server computer, and the virtual local area networks (VSANs) switch to which the server computer is assigned or associated.

Operational attributes that may be configurable include, by way of non-limiting example, data indicating external management access, firmware bundles and management of the server computer, health policy of the server computer, and an activation attribute that indicates whether the service profile is active or inactive.

FIG. 1 is a block diagram of a UCS 100 according to one or more examples of the present disclosure. In an example, the UCS 100 may include an enclosure 110, a fabric interconnect 120, and a plurality of cloud services including e.g. a storage area network (SAN) 130, a local area network (LAN) 132, and management services (MGMT) 134. The enclosure 110 may be configured as a rackmount system, a blade system, or any other suitable enclosure type. To facilitate discussion, the enclosure 110 will be treated herein as a blade chassis. The enclosure 110 may include a number of slots to receive UCS nodes 140, such as e.g. servers 140. It should be noted that a server is not the only type of possible UCS nodes which could benefit from implementing embodiments of the present disclosure, and that other types of UCS nodes are available and applicable for use with the techniques described herein. For example, according to various embodiments of the present disclosure, UCS nodes may be provisioned for use as storage appliances, security appliances, or other useful types of appliances.

In the example shown in FIG. 1, the enclosure 110 is designed to include two servers 140, but, in other embodiments, the enclosure 110 may be designed to have more or less than two servers 140. Provisioning techniques described herein may advantageously be applied with the UCS nodes which are not yet physically present in the enclosure 110 or, even if present, are not booted up, which is indicated in FIG. 1 with the servers 140 shown with dashed lines.

Each of the servers 140 may include a respective host bus adapter (HBA) 142 configured to connect the server 140, which may, in this context, be referred to as a "host," to other network elements, e.g. to other network and storage devices, in the UCS 100.

Each of the servers 140 may also include one or more configurable resources 144, such as e.g. hard drives, solid state drives, virtualizable adapters, etc. The resources 144 may comprise UCS-compatible resources as well as off-the-shelf and legacy solutions which could be provided as configurable resources on UCS nodes.

FIG. 1 further illustrates that each of the servers 140 may also include a baseboard management controller (BMC) 146, provided to perform functions related to management and configuration of the configurable resources 144. Notably, the UCS 100 provides the possibility that various network elements, such as e.g. configurable resources 144, do not have to physically be present within the servers 140, but could be configured and communicatively connected to the UCS fabric interconnect 120 so that the servers 140 have access to these resources 144 as if the resources 144 were physically implemented within the servers 140.

In various embodiments, some servers, e.g. the server 140-1 could be a full-slot server, while other servers, e.g. the server 140-2 could be a half-slot server. It will be recognized that half-slot servers are in many respects similar to full-slot servers, including the provision of an HBA 142, one or more configurable resources 144, a BMC 146, as well as a processor, a memory, and an OS not shown in FIG. 1. However, half-slot servers may include fewer overall resources then full-slot servers. In particular, in some embodiments, half-slot servers may include fewer processors and fewer DIMMs, thus providing less processing power and memory. Full-slot servers and half-slot servers are explained by way of example only. It should be recognized that many other types of servers are possible, and that in certain embodiments, not all servers 140 need to be necessarily provided with the enclosure 110. The illustration of FIG. 1 is not intended to imply herein that the enclosure 110 is required to have at least one full-slot server 140-1 or at least one half-slot server 140-2. Furthermore, the enclosure 110 may include additional servers 140, which may be of any species. Thus, it should be appreciated that the enclosure 110 may include a plurality of different types of UCS nodes in many different configurations.

In some embodiments, although illustrated and described as being included within the enclosure 110, a server 140 or any other type of a UCS node for which techniques described herein may be applied may be a standalone device, i.e. not included within the enclosure 110, that is communicatively coupled to the enclosure 110 or/and to the fabric interconnect 120.

It should also be noted that various types of interconnections and buses will be disclosed within the present disclosure. As used throughout the present disclosure, a "bus" or "interconnect" includes any wired or wireless interconnection line, network, connection, bundle, single bus, multiple buses, crossbar network, single-stage network, multistage network or other conduction medium operable to carry data between parts of a computing device, or between computing devices. It should be noted that these uses are disclosed by way of non-limiting example only, and that some embodiments may omit one or more of the foregoing buses, while others may employ additional or different buses.

It will also be recognized that the enclosure 110 may also include blades or slots that are not servers 140 and that are not UCS specific devices. For example, the enclosure 110 may include additional power supplies and support hardware that is not specific to the UCS 100. In particular, the enclosure 110 may also include one or more fabric extenders 150. In a particular example of FIG. 1, two fabric extenders 150-1 and 150-2 are shown. Fabric extenders 150 may be special UCS nodes that may occupy a blade or rack position within the enclosure 110. In one embodiment, the fabric extender 150-1 and fabric extender 150-2 may be operable to service different types of servers 140. Continuing with the example of full-slot and half-slot servers, for example, the fabric extender 150-1 may be configured and operable primarily to service full-slot servers 140-1, while the fabric extender 150-2 may be configured and operable primarily to service half-slot server 140-2. In certain embodiments, the primary intelligence for performing UCS functions with the enclosure 110 may be provided by one of more of the fabric extenders 150. Thus, the fabric extender(s) 150 may serve as an intermediary between the servers 140 and the fabric interconnect 120. By way of example, each fabric extender 150 may include an adapter firmware P, a chassis manager C, and an interconnect infrastructure I. The adapter firmware P may be operable to perform global NIC configuration and perform statistics and housekeeping. The chassis manager C may be configured to perform server discovery and sequencing, power management, temperature monitoring, and fan control looping. The interconnect infrastructure I may be included to provide a data routing interface. In certain embodiments, each of P, I, and C may be provided as ASICs or other fixed-logic device. Advantageously, ASICs may provide increased processing speed and efficiency over certain programmable processing devices. It should be noted, however, that the specific features of the fabric extender 150 are provided by way of example only, and are intended to be non-limiting. It will be recognized that many additional configurations are possible for a fabric extender 150, and it is intended that they be included within the scope of the present disclosure.

The fabric extender 150 may communicatively couple the enclosure 110 to a one or more fabric interconnects 120. In the example shown in FIG. 1, two fabric interconnects 120-1 and 120-2 are provided. In an example, the fabric interconnect 120-1 may be configured and operable to communicate primarily with the fabric extender 150-1, while the fabric interconnect 120-2 may be configured and operable primarily to communicate and work with the fabric extender 150-2. However, it will be recognized that many other configurations are possible.

Notably, the UCS may further include one or more UCS managers (UCSM) operable to perform UCS configuration and control services within the context of the UCS 100. The example of FIG. 1 illustrates that each fabric interconnect 120 includes a respective UCSM 122, shown as a UCSM 122-1 in the fabric interconnect 120-1 and a UCSM 122-2 in the fabric interconnect 120-2, which may advantageously provide a completely redundant UCS fabric with two independent fabric interconnect paths. However in other embodiments, multiple fabric interconnects may share an UCSM or include more than one UCSMs, or the UCSM may be implemented apart from the fabric interconnect 120, e.g. by being communicatively coupled to the fabric interconnect 120 as well as to other network elements of the UCS 100.

A UCSM is configured to provide the primary intelligence and top-level control of the overall UCS 100. The UCSM 122 may include, for example, infrastructure management subsystems, transactional information model subsystems, and an application gateway subsystem that may be configured to interact with system components.

Each of the fabric interconnects 120 may also include a plurality of ASICs, not specifically shown in FIG. 1, e.g. provided for data path connectivity between various network elements of the UCS 100. Each of the UCSMs 122 may be communicatively coupled to any of the plurality of the individual ASICs of the fabric interconnects, and each of the UCSMs 122 and the individual ASICs of the fabric interconnects may be communicatively coupled to cloud services, such as the management services 134. Fabric interconnects 120-1 and 120-2 may also be configured to connect to other cloud services. For example, the fabric interconnect 120-1 may communicatively couple to the SAN 130-1, while the fabric connect fabric interconnect 120-2 may be communicatively coupled to the SAN 130-2.

Furthermore, the fabric interconnect 120-1 and 120-2 may both jointly connect to a local area network (LAN) 132. Thus, the UCS 100 is operable to connect to a local network, and in appropriate instances may also be operable to connect to a broader network such as an Internet. It should be noted that the LAN 132 and the Internet are provided by way of example only, and other types of networks are anticipated herein. As used herein, a network, including the LAN 132, includes any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

The UCS 100 as described above allows implementing Fibre Channel (FC), a high-speed network technology primarily used to connect computer data storage devices to servers in an enterprise storage network. As such, the UCS 100 may be configured to implement FC switched fabric (FC-SW), i.e. a network topology in which network nodes interconnect via one or more network switches. FC mainly runs on optical fiber cables within and between data centers.

To secure data transmission and storage, FC employs a number of techniques. Some of these techniques advantageously leverage strategies common to Internet Protocol (IP) networking. For example, in the FC-SW topology, network elements may be connected to each other through one or more FC switches and visibility among devices/nodes in a fabric is typically controlled with zoning which is similar to Access Control Lists (ACLs) in IP networking. In general, FC zoning refers to the partitioning of a FC fabric into smaller subsets to restrict interference, add security, and to simplify management. In context of the UCS 100 shown in FIG. 1, zoning may be explained as follows.

What makes the UCS architecture particularly advantageous is that UCS nodes, e.g. servers 140, can have configurable resources, e.g. resources 144, which may but do not have to be local to the servers 140. For example, storage capacity for the servers 140 may be implemented as a configurable resource that is not required to be local to the server 140. Doing so may be preferable because e.g. local hard drives typically have higher error rates and are relatively difficult to re-configure if the server 140 changes (e.g. if the server 140 is upgraded to a newer model). The UCS 100 allows logically building a hard drive up in a cloud, identified by a logical unit number (LUN). Zoning then refers to the process of assigning disks (or, more generally, configurable resources) to hosts (or, more generally, UCS nodes such as e.g. servers). Disks and hosts are dedicated to virtual storage area networks (VSANs) to further segment these storage fabrics. Both disks and hosts can belong to multiple zones within a single VSAN, but disks and hosts cannot pan VSANs. Zoning results in the creation of zone sets, indicating correspondence between different disks and different hosts. Such FC zoning may be considered analogous to Access Control Lists (ACLs) in IP networking because zoning defines which disks/LUNs, sometimes referred to as "targets," may be accessible by which hosts/servers, sometimes referred to as "initiators." Once disks and hosts have been grouped into sets, configuration may be applied to entire groups of zones. In a similar process of controlling access between initiators and targets on a VSAN or SAN, the target device can implement a LUN "masking" operation where the identity of the initiator and what LUN they can see is managed on the target.

The tool that customer may use to create zones and manage LUN masking could be as simple as e.g. an Excel spreadsheet. However, this would be cumbersome and time-consuming. Therefore, various tools have been developed for grouping network elements into zones. Similarly, tool capabilities that provision storage will often allow the configuration of LUN masking to certain initiators. These tools usually provide a graphical user interface (GUI) showing which servers are up on the fabric, which disks are up on the fabric, then a user may click on those together to create a zone (i.e. to create a communicative connection between a particular server and a particular disk) and/or configure masking. One problem with conventional implementation of this approach is that it requires that the server needs to be already present for this to work, i.e. the server needs to be "seen" on the fabric. Therefore, in conventional implementations, a system administrator would typically boot up the server so that the server is in a semi-operable state because the server is booted but it is not connected to any storage element yet (at that time the server typically does not have an operating system running either). Because the server does not have a hard disk at that time, a system administrator would expect a boot failure (or inability to see the target for non-boot SAN storage), however booting would leave the server in an operational, although non-performing state, which is sufficient for the server to be "seen" by the provisioning toolsets that can create zones. While the server is in this operational but non-performing state, zoning functions may be applied, by implementing any of the known provisioning toolsets, resulting in that the server is linked to a disk (or multiple disks). After this, the server needs to be re-booted so that the server can "see" its' disk (i.e. so that the server has access to its configurable resource, in this example—the hard drive). In all of these steps of such a conventional implementation, significant amount of manual work on the part of system administrators is involved, there is a lot of waiting time because system administrators need to find time to get around to performing each step, and the server must already be physically present.

Figure 2:
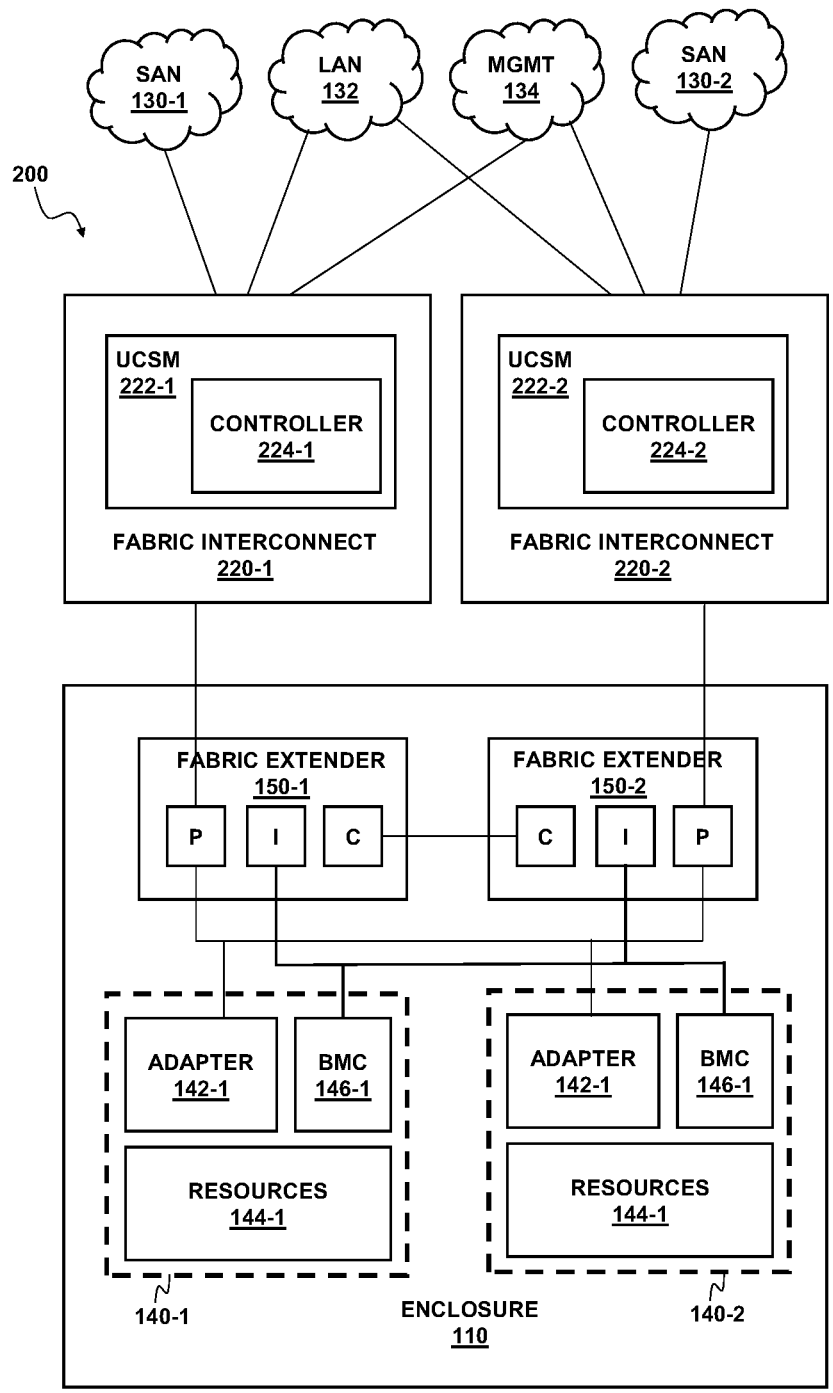
FIG. 2 is a block diagram of a network environment implementing a UCS with controller-based configuration proxy, according to one or more embodiments of the present disclosure.

FIG. 2 is a block diagram of a network environment implementing a UCS 200 with controller-based configuration proxy, according to one or more embodiments of the present disclosure. The UCS 200 shown in FIG. 2 is similar to the UCS 100 shown in FIG. 1. In particular, the same reference numbers used in both of these figures refer to similar or analogous elements in both UCS configurations and description of these elements provided for FIG. 1 are applicable for FIG. 2, unless otherwise specified. Therefore, in the interests of brevity, descriptions of the analogous elements are not repeated for FIG. 2. Instead, differences between FIGS. 2 and 1 will now be described.

Unlike the UCS 100 shown in FIG. 1, the UCS 200 includes a controller that can improve on at least some of the drawbacks of the conventional implementations described above. FIG. 2 illustrates such a controller being implemented in each UCSM of each fabric interconnect—shown as a controller 224-1 implemented within the UCSM 222-1 of the fabric interconnect 220-1 and as a controller 224-2 implemented within the UCSM 222-2 of the fabric interconnect 220-2. However, embodiments with any other number of such controllers, implemented within any network element, e.g. outside of the UCSM 222 but in communicative connection with the UCSM 222, are also within the scope of the present disclosure. In the following, functionality of such a controller is described with reference to a controller 224, which could e.g. be implemented as the controller 224-1 or the controller 224-2.

Inventor of the present application realized that because a compute infrastructure controller 224 that is included as a part of or communicatively connected to and privy to information known to the UCSM 222 would have a global view and control of the UCS, it can serve to proxy/emulate the existence of any particular UCS node, e.g. a server 140, on the fabric, so that zoning and masking can be carried out. Such a controller could be configured to log in to the fabric as if it is the initiator device (i.e. as if it is a particular server 140), and stay in the logged in state for at least the duration of the part of the provisioning when zoning and masking is performed. Zoning would be performed as known in the art, except that instead of the actual server 140 being logged in to the fabric, it would be the controller 224 that is imitating such a server. This means that zoning could start even when there is no real, physical server present yet (i.e. the controller 224 is proxying the server). Then, once the real server is in place, the server can be booted up, for the first time, and it would already be configured and connected to a disk because the linkage from the server to its remote disk was already configured by the UCSM controller 224 imitating the server before. This would make provisioning/zoning process significantly less complicated because the system administrators can then immediately proceed with e.g. automated installation of this server. Such an approach would allow customers to get a head start on provisioning—e.g. when customers bought servers but servers have not arrived yet and the customers already have SAN storage, the customers can get a head start on configuring the system by creating zoning for the servers.

Figure 3:
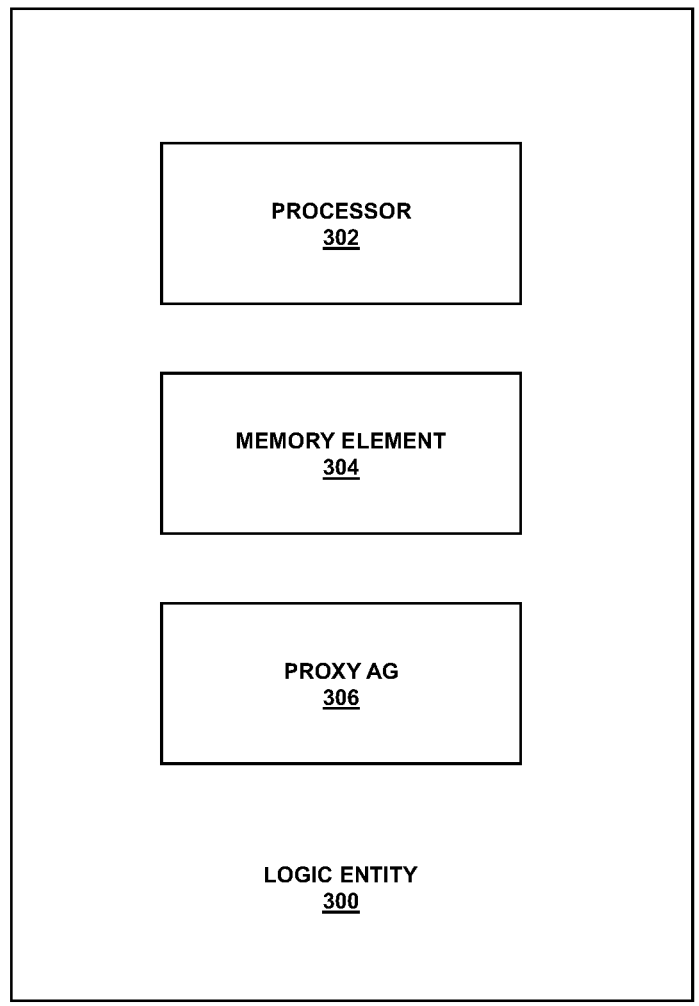
FIG. 3 illustrates a logical entity for assisting configuration of resources on a network node, according to some embodiments of the present disclosure.

FIG. 3 illustrates a logical entity 300 for assisting configuration of resources on a network node, e.g. on a UCS server node, according to some embodiments of the present disclosure. In some embodiments, the UCSM controller 224 may be implemented as the logical entity 300 and, in the following, a controller-based configuration proxy method described herein is described as carried out by the controller 224. However, in general, any centralized controller element, include non-UCS based centralized controllers, could be implemented as the logical entity 300 and configured to carry out the controller-based configuration proxy method described herein.

FIG. 3 may be considered to illustrate an exemplary internal structure associated with the controller 224. With the exception of a Proxy Application Gateway (AG) 306, which is a process specific to the functionality of the controller 224 implementing the configuration proxy method described herein, elements shown in FIG. 3 may be considered to illustrate an exemplary internal structure associated with any other elements shown in FIG. 2, such as e.g. the UCSM 222, the adapter 142, etc.

As shown in FIG. 3, the logic 300 may include at least one processor 302 and at least one memory element 304, along with any other suitable hardware and/or software to enable its intended functionality of assisting configuration of resources on a network node by a controller-based configuration proxy as described herein. In some embodiments, the processor 302 can execute software or an algorithm to perform the activities as discussed in this Specification, e.g. the processor 302 can execute the Proxy AG 306 configured to perform steps as described below with reference to FIG. 4.

In some embodiments, the controller 224 may share at least some of the elements shown in FIG. 3 with the UCSM 222, i.e. a processor of the UCSM 222 may be viewed as the processor 302 of the controller 224, or a memory element of the UCSM 222 may be viewed as the memory element 304 of the controller 224.

The processor 302 may be configured to communicatively couple to other system elements via one or more interconnects or buses. Such a processor may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (ASIC), or a virtual machine processor. The processor 302 may be communicatively coupled to the memory element 304, for example in a direct-memory access (DMA) configuration. Such a memory element may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Any of the memory items discussed herein should be construed as being encompassed within the broad term "memory element." The information being tracked or sent to the logic 300, the controller 224, the UCSM 222, or any network element shown in the FIGUREs could be provided in any database, register, control list, cache, or storage structure, all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements shown in FIGS. 2 and 3, e.g. the controller 224, can also include suitable interfaces for receiving, transmitting, and/or otherwise communicating data or information in a network environment.

Note that in certain example implementations, mechanisms for assisting configuration of resources on a network node by a controller-based configuration proxy as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. memory 304 shown in FIG. 3, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. processor 302 shown in FIG. 3, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

Figure 4:
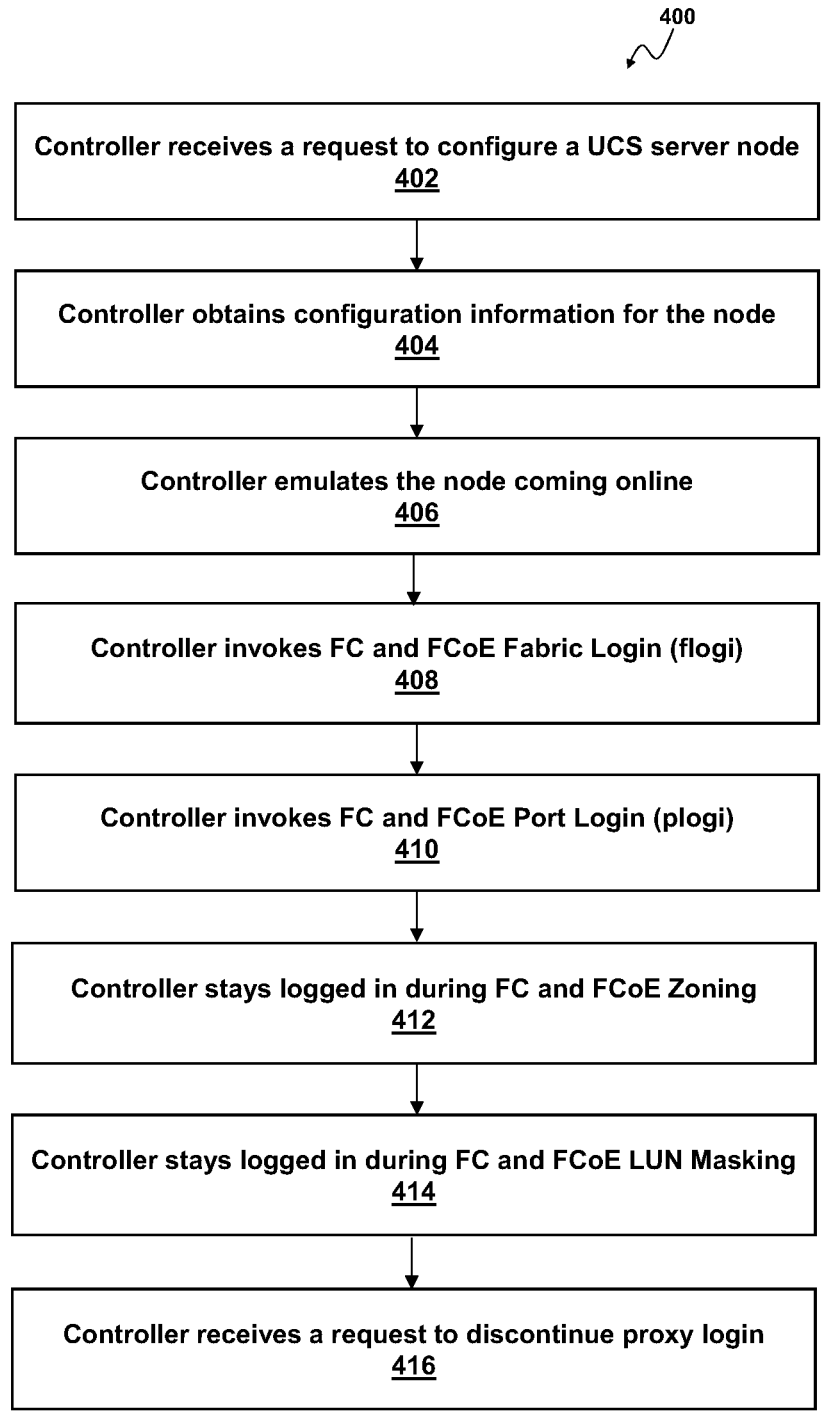
FIG. 4 is a flow chart of a UCS controller-based configuration proxy method, according to one or more embodiments of the present disclosure.

FIG. 4 is a simplified flow diagram of a controller-based configuration proxy method 400 illustrating example operations associated with assisting configuration of resources on a network node by the controller 224, according to some embodiments of the present disclosure. While the method 400 is explained below with reference to elements shown in FIG. 2, i.e. in context of the UCS 200, any system configured to perform the steps of method 400, in any order, is within the scope of the present disclosure.

As shown in FIG. 4, the method 400 begins with the controller 224 receiving a request from a human administrator, indicating that configuration of a particular UCS node 140, e.g. a server, is desired (step 302). Such a request is typically provided to the UCSM 222 by a system administrator on the customer side that acquired the UCS node. Because the controller 224 is in communicative connection with and privy to some of the information available to the UCSM 222, the controller 224 would receive the request received by the UCSM 222, which request serves as an indication to the controller 224 to invoke the proxy login.

Figure 5:
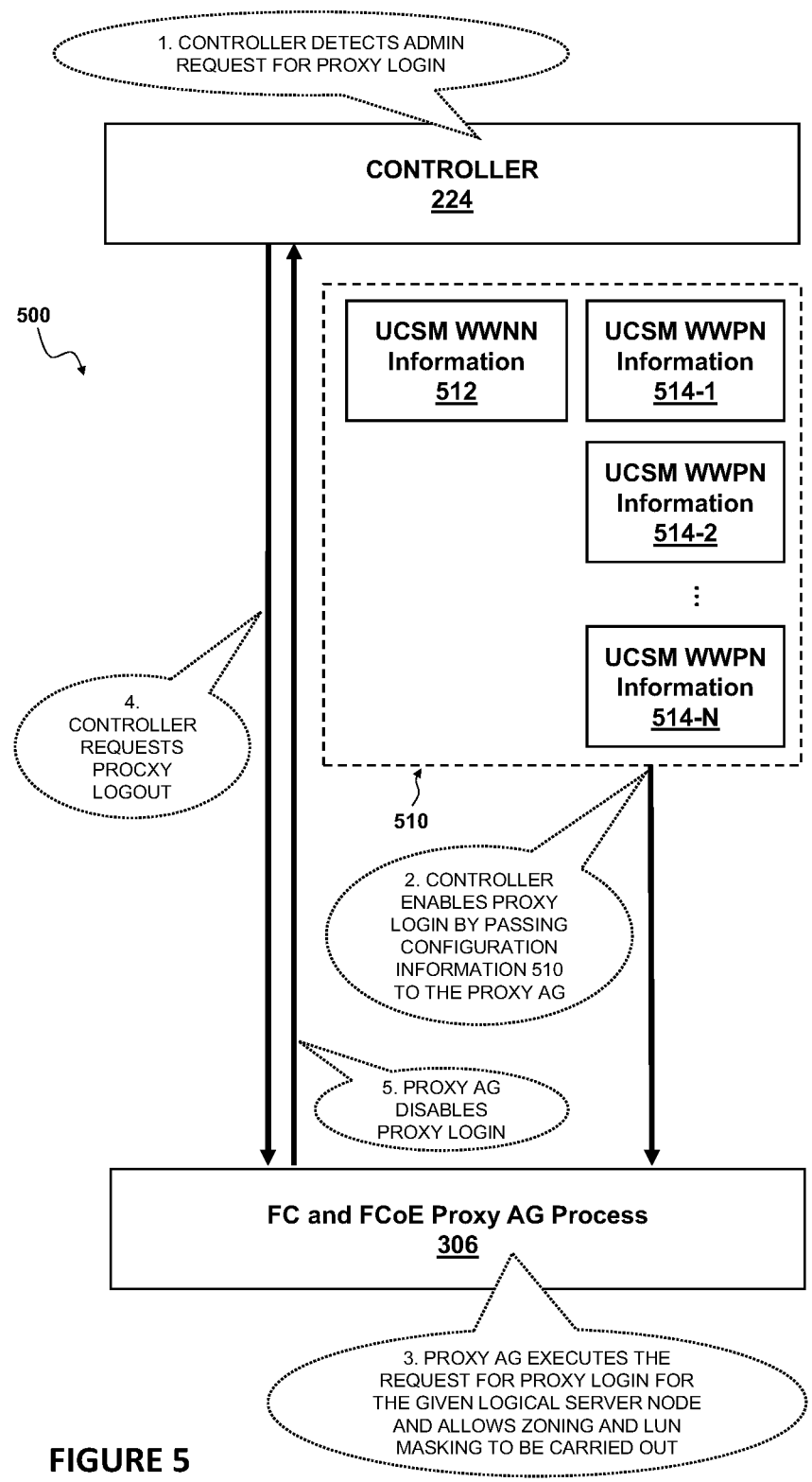
FIG. 5 is a block diagram of a UCSM controller interacting with a Proxy AG, according to one or more embodiments of the present disclosure.

Triggered by the received request, the controller 224 then obtains, e.g. from an internal database of the UCSM 222, access to which is provided to the controller 224, the desired configuration information for the UCS node 140 (step 404). This desired configuration information is typically setup beforehand by the administrator for how the UCS node 140 is to be configured within the system. In one example, the configuration information could include one or more WWNNs and WWPNs for the node to be configured. Typically, a server would be associated with one WWNN and any arbitrary number of WWPNs, as shown in FIG. 5 with configuration information 510 including one UCSM WWNN 512 and N number of UCSM WWPN's 514-1 through 514-N.

Having obtained this internally stored desired configuration information, the controller 224 is able to emulate the server 140 coming online by making a virtual link between the fabric interconnect 220 and the controller 224 operational, e.g. using Extended Link Services (ELS) processes, as known in the art of FC networking (step 406).

Once the link is operational, the controller 224 can instruct the Proxy AG 306 process to perform a fabric login to the fabric interconnect 220 (step 408). To this end, the Proxy AG 306 is configured to perform the Fabric Login (FLOGI) process as known in the art to determine whether a fabric is present. If a fabric is detected, then the Proxy AG 306 exchanges service parameters with a fabric controller, e.g. with a Fabric Login Server which typically exists within the fabric interconnect 220, parameters including e.g. a unique 24-bit address Fiber Channel Identification (FCID)/PID for the server 140, class of service for the server 140, a buffer space to buffer credits (BB_Credit), etc. The Proxy AG 306 also provides the configuration parameters of the server 140 obtained in step 404 to the Fabric Login Server, to ensure that the server 140 is configured in accordance with these configuration parameters. Conventionally, a successful FLOGI results in the unique 24-bit address FCID/PID being sent to the server 140. However, since according to the embodiments of the present disclosure, there is no physical server yet, the controller 224 obtains this address. Thus, instead of the server 140 (in particular, instead of the adapter 142 of the server 140), the controller 224 is configured to issue and successfully complete a FLOGI command before communicating with other devices in the fabric.

In the next step, the controller 224 again may utilize the configuration information obtained in step 404 to perform a port login on the fabric interconnect 120, again as if the controller 224 was the server 140 itself (step 410). To this end, the Proxy AG process 306 is configured to perform the Port Login (PLOGI) process as known in the art, e.g. an N port login. This port login process will allow the exchange of additional data between the controller 224 and the fabric interconnect 220 for control and server access.

PLOGI process functions to discover the type of device connected, in this case the "device" being emulated by the controller 224, and establish the port type and negotiate port speed. As is known, an auto discovery process of the FC protocol enables private storage devices that accept a process login (PRLI) to communicate in a fabric. If device probing is enabled, the embedded port performs a PLOGI and attempts a PRLI into the device to retrieve information to enter into the name server. This enables private devices that do not explicitly register with the Name Server (NS) to be entered in the NS and receive full fabric access. A fabric-capable device registers its information with the name server during a FLOGI. These devices typically register information with the name server before querying for a device list. The embedded port still performs a PLOGI and attempts a PRLI with these devices. If a port decides to end the current session, it initiates a logout. A logout concludes the session and terminates any work in progress associated with that session.

Once the controller 224, via the Proxy AG 306 process, successfully logged in to fabric and port as if it was the node 140, using the WWNN and one or more WWPNs of the node, it may be considered to have gained access to a VSAN or SAN, and will perform a process login (PRLI) to learn and advertise existence on the fabric. At this point, the controller 224 stays logged in while FC and FC over Ethernet (FCoE) Zoning configuration function as known in the art are carried out (step 412), e.g. as carried out by the SAN administrator on the Fiber Channel fabric management software. As a result, SAN storage may be configured as a configurable resource 144 for the server node 140.

Similarly, the controller 224 via the Proxy AG 306 process stays logged in while FC and FCoE LUN Masking function as known in the art are carried out (step 414) in order for the administrator of the storage provider software to perform LUN masking with respect to the UCS node 140 that the controller 224 with the Proxy AG 306 emulates and with respect to the one or more resources 144 to be configured on that node.

The method 400 may end with the controller 224 receiving an indication that the proxy login method is to be stopped (step 416), e.g. from the UCSM 122 administrator, once desired configuration of the server node 140 has been performed. In this manner, resources 144, such as e.g. SAN storage 130, e.g. disks, could be configured on the UCS nodes 140, such as e.g. servers.

In conventional implementations where the server node 140 itself does the login via the UCS fabric FCoE process, the UCS fabric interconnect 120 acts as an intermediary for translation of FCoE traffic to typical FC or FCoE target devices on the SAN 130-1 (for fabric interconnect 120-1) or 130-2 (for fabric interconnect 120-2). In such implementations, functionality of steps 404-414 is carried out by the initiator software being executed on the respective HBA 142 of the node 140. In contrast, according to the proxy login method of the present disclosure as illustrated in FIG. 4, the controller 224 gathers the WWNN and complete list of WWPN elements, as well as any other relevant configuration parameters, from the internal database of the UCSM 222, and then uses these configuration parameters to call the Proxy AG process 306 to execute steps 404-414 on behalf of the HBA 142 in the server 140. The controller 224 and its Proxy AG process 306 will maintain the state as if it were the initiator software on any real HBA 142, until the administrator on UCSM revokes the "proxy login" method for that server node. In this way, the adjacent teams responsible for the storage fabric, and the storage elements can perform the zoning and LUN masking as needed, and inform the UCS administrator when complete. This entire process can now happen prior to the given server 140 that was logically configured within the UCSM 222 being physically installed and booted into a partial up state.

FIG. 5 is a block diagram 500 of a UCSM controller, e.g. the controller 224, interacting with a Proxy AG, i.e. a process supporting a controller-based configuration proxy method described herein, e.g. the Proxy AG 306, according to one or more embodiments of the present disclosure. FIG. 5 provides a different view of the method shown in FIG. 4. As shown in FIG. 5, in step 1, controller 224 detects administrator request for proxy login on behalf of a particular logical server node 140 (similar to step 402 shown in FIG. 4). The controller 224 then gathers configuration information for the logical server node to be configured, e.g. configuration information 510 as shown in FIG. 5, and passes it to the Proxy AG 306, in step 2, thereby enabling the Proxy AG 306 to execute the request for proxy login for the logical server 140 and allow zoning and LUN masking to be carried out, in step 3. Steps 2 and 3 of FIG. 5 are similar to steps 404-414 of FIG. 4. At some point, the controller 224 requests the Proxy AG 306 to perform proxy logout, in step 4. The Proxy AG 306 then disables the proxy login (i.e. performs proxy logout), in step 5. Steps 4 and 5 of FIG. 5 may be viewed as further details of what happens after step 416 of FIG. 6.

Figure 6:
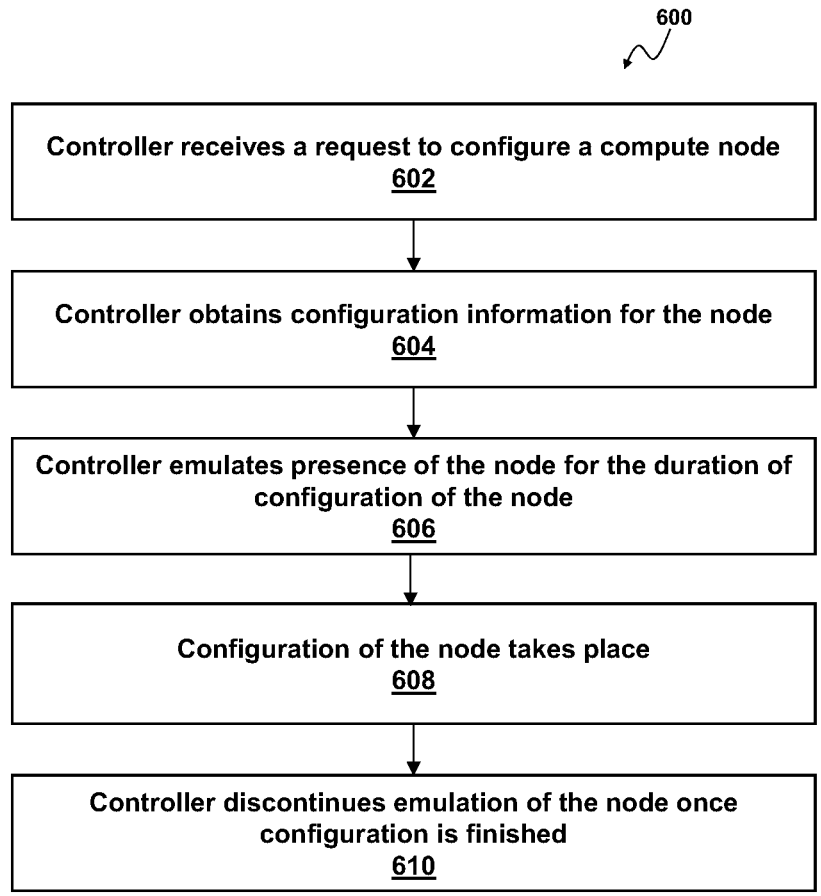
FIG. 6 is a flow chart of a general controller-based configuration proxy method, according to one or more embodiments of the present disclosure.

It should be noted, again, that much of the infrastructure discussed herein can be provisioned as a part of any type of network element, not necessarily servers or storage nodes, and may be implemented outside of context of UCS. FIG. 6 is a flow chart of a general controller-based configuration proxy method 600, according to one or more embodiments of the present disclosure. The method 600 of FIG. 6 is similar, but more general, than the method 400 of FIG. 4. As described above, while the method 400 was explained in context of the UCS, in particular of the UCS 200 shown in FIG. 2, any system configured to perform the steps of method 400, in any order, is within the scope of the present disclosure. A controller-based configuration proxy method carried out by such a system in general is summarized in FIG. 6.

As shown in FIG. 6, the method 600 begins with a controller receiving a request indicating that configuration of a particular compute node is desired (step 602). A controller in accordance with the method 600 would be allowed to obtain enough configuration information for the computer node (step 604) so that the controller can login to the fabric on behalf of the compute node, and stay logged in for the duration of time while the compute node, as emulated by the controller, is configured as known in the art in which the method 600 is implemented (step 606). Step 608 illustrates that the configuration of the compute node takes place with the controller representing/emulating the compute node. The method 600 may end with the controller discontinuing emulation of the compute node once desired configuration of the node has been performed (step 610). In this manner, various resources could be configured on various compute nodes. Some examples of configurable resources on compute nodes include SAN storage resources, Ethernet adapter presence, Transmission Control Protocol/Internet Protocol (TCP/IP) services, dynamic domain name server (DNS) updates, domain membership, etc. for the compute node.

Variations and Implementations

As used herein, the term "network element" (also sometimes referred to, interchangeably, as a "network node", "node", or "network device") can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A management controller configured for assisting configuration of a compute node, the management controller comprising:
   a processor, and
   a memory communicatively coupled to the processor and operable to instruct the processor to assist configuration of the compute node by:
   receiving a first request to configure the compute node;
   obtaining configuration information for the compute node upon receipt of the first request to configure the compute node;
   serving as a proxy emulating a presence of the compute node on a fabric by logging in to the fabric on behalf of the compute node using the configuration information and staying logged in to the fabric while the compute node is being configured with one or more configurable resources;
   configuring the compute node with the configuration information;
   receiving a second request indicating the proxy is to be stopped once configuration of the compute node has been performed; and
   discontinuing to serve as the proxy upon completion of the configuration of the compute node.

2. The management controller according to claim 1, wherein,
   the management controller comprises a controller communicatively connected to a Unified Computing System Manager (UCSM), and
   the configuration information is obtained via the controller from a database of the UCSM.

3. The management controller according to claim 1, wherein the compute node comprises a Fiber Channel (FC) attached host.

4. The management controller according to claim 3, wherein the configuration information comprises a worldwide node name (WWNN) for a server and one or more worldwide port names (WWPNs) for the server.

5. The management controller according to claim 3, wherein logging in to the fabric comprises the management controller using the configuration information to carry out a fabric login (FLOGI) on behalf of the compute node.

6. The management controller according to claim 5, wherein logging in to the fabric further comprises the management controller using the configuration information to carry out a port login (PLOGI) on behalf of the compute node.

7. The management controller according to claim 5, wherein logging in to the fabric further comprises the management controller carrying out Extended Link Services (ELS) to emulate the compute node coming online prior to carrying out the FLOG!.

8. The management controller according to claim 3, wherein staying logged in to the fabric while the compute node is being configured comprises staying logged in and performing actions representing the compute node while FC and/or FC over Ethernet (FCoE) zoning is carried out.

9. The management controller according to claim 8, wherein staying logged in to the fabric while the compute node is being configured further comprises staying logged in and performing actions representing the compute node while FC and/or FCoE logical unit number (LUN) masking is carried out.

10. The management controller according to claim 3, wherein the one or more configurable resources comprise one or more storage area network (SAN) storage devices.

11. The management controller according to claim 1, wherein the compute node comprises a server, a storage appliance, or a security appliance, and the one or more configurable resources comprise one or more of a hard drive, a solid state drives, and a virtualizable adapter.

12. One or more non-transitory tangible media encoding logic that include instructions for execution that, when executed by a processor, are operable to perform operations for assisting configuration of a compute node, the operations comprising:
   receiving a first request to configure the compute node;
   obtaining configuration information for the compute node upon receipt of the first request to configure the compute node;

serving as a proxy emulating a presence of the compute node on a fabric by logging in to the fabric on behalf of the compute node using the configuration information and staying logged in to the fabric while the compute node is being configured with one or more configurable resources;

configuring the compute node with the configuration information;

receiving a second request indicating the proxy is to be stopped once configuration of the compute node has been performed; and discontinuing to serve as the proxy upon completion of the configuration of the compute node.

13. The media according to claim 12, wherein,
the configuration information comprises a worldwide node name (WWNN) for a server and one or more worldwide port names (WWPNs) for the server, and
the configuration information is obtained via a controller from a database of a Unified Computing System Manager (UCSM).

14. The media according to claim 12, wherein logging in to the fabric comprises using the configuration information to carry out a fabric login (FLOG!) on behalf of the compute node.

15. The media according to claim 14, wherein logging in to the fabric further comprises using the configuration information to carry out a port login (PLOGI) on behalf of the compute node.

16. The media according to claim 15, wherein logging in to the fabric further comprises carrying out Extended Link Services (ELS) to emulate the compute node coming online prior to carrying out the FLOG!.

17. The media according to claim 12, wherein staying logged in to the fabric while the compute node is being configured comprises staying logged in and performing actions representing the compute node while FC and/or FC over Ethernet (FCoE) zoning is carried out.

18. The media according to claim 12, wherein staying logged in to the fabric while the compute node is being configured comprises staying logged in and performing actions representing the compute node while FC and/or FCoE logical unit number (LUN) masking is carried out.

19. A method for assisting configuration of a compute node, the method comprising:
receiving a first request to configure the compute node;
obtaining configuration information for the compute node upon receipt of the first request to configure the compute node;
serving as a proxy emulating a presence of the compute node on a fabric by logging in to the fabric on behalf of the compute node using the configuration information and staying logged in to the fabric while the compute node is being configured with one or more configurable resources;
configuring the compute node with the configuration information;
receiving a second request indicating the proxy is to be stopped once configuration of the compute node has been performed; and
discontinuing to serve as the proxy upon completion of the configuration of the compute node.

20. The method according to claim 19, wherein the one or more configurable resources comprise one or more Ethernet adapters.

* * * * *